United States Patent
Dyavarasegowda et al.

(10) Patent No.: US 9,295,360 B2
(45) Date of Patent: Mar. 29, 2016

(54) DEVICES FOR BREWING AND/OR STEEPING TEA

(71) Applicant: Cornelius, Inc., St. Paul, MN (US)

(72) Inventors: Ashok Kumara Dyavarasegowda, Bangalore (IN); Servesh Adderi Ranganath, Shimoga (IN); Ramaraju Suraparaju Pattabi, Bangalore (IN); Nishant Kulkarni, Bangalore (IN); Jeff Garascia, Dublin, OH (US); Fernando Sanchez, Chicago, IL (US)

(73) Assignee: Cornelius, Inc., St. Paul, MN (US)

( * ) Notice: Subject to any disclaimer, the term of this patent is extended or adjusted under 35 U.S.C. 154(b) by 0 days.

(21) Appl. No.: 14/658,934

(22) Filed: Mar. 16, 2015

(65) Prior Publication Data

US 2015/0257587 A1   Sep. 17, 2015

Related U.S. Application Data

(60) Provisional application No. 61/953,297, filed on Mar. 14, 2014.

(51) Int. Cl.
| | |
|---|---|
| *A47J 31/46* | (2006.01) |
| *A47J 31/00* | (2006.01) |
| *A47J 31/52* | (2006.01) |
| *A23F 3/18* | (2006.01) |

(52) U.S. Cl.
CPC . *A47J 31/46* (2013.01); *A23F 3/18* (2013.01); *A47J 31/002* (2013.01); *A47J 31/52* (2013.01)

(58) Field of Classification Search
CPC ......... A47J 31/002; A47J 31/46; A47J 31/52; A23F 3/18
See application file for complete search history.

(56) References Cited

U.S. PATENT DOCUMENTS

| | | | | |
|---|---|---|---|---|
| 3,040,649 | A * | 6/1962 | Day | A47J 31/053 99/299 |
| 3,683,790 | A * | 8/1972 | Black | A47J 31/053 99/289 R |
| 4,226,175 | A * | 10/1980 | Sandor | A47J 31/42 99/286 |
| 6,220,147 | B1 | 4/2001 | Priley | |
| 6,488,976 | B1 | 12/2002 | Priley | |
| 6,988,641 | B2 | 1/2006 | Jones et al. | |
| 7,351,576 | B1 | 4/2008 | Harmon et al. | |
| 7,757,600 | B2 | 7/2010 | Jones et al. | |
| 8,534,186 | B2 | 9/2013 | Glucksman et al. | |
| 2004/0056046 | A1 | 3/2004 | Jones et al. | |
| 2004/0194629 | A1 | 10/2004 | Jones et al. | |
| 2007/0059819 | A1 | 3/2007 | Storch | |
| 2008/0017042 | A1 * | 1/2008 | Almblad | A47J 31/007 99/280 |
| 2009/0199721 | A1 * | 8/2009 | Hausslein | A47J 31/053 99/302 R |

(Continued)

FOREIGN PATENT DOCUMENTS

| | | |
|---|---|---|
| AU | 685073 | 7/1994 |
| CA | 2152385 | 7/1994 |

(Continued)

OTHER PUBLICATIONS

International Search Report and Written Opinion, PCT/US2015/020727, date of mailing Jun. 17, 2015.

*Primary Examiner* — Anthony Weier
(74) *Attorney, Agent, or Firm* — Andrus Intellectual Property Law, LLP

(57) ABSTRACT

Shown are devices and methods for brewing and steeping tea. The devices and methods for brewing and steeping tea utilize steam, heated liquid, agitation, and recirculation.

18 Claims, 5 Drawing Sheets

(56) References Cited

U.S. PATENT DOCUMENTS

| | | |
|---|---|---|
| 2011/0068118 A1 | 3/2011 | Jones et al. |
| 2012/0064618 A1 | 3/2012 | Winslow |
| 2012/0100275 A1 | 4/2012 | Bishop et al. |
| 2012/0186456 A1 | 7/2012 | Kuempel |
| 2012/0219686 A1 | 8/2012 | Bombeck et al. |

FOREIGN PATENT DOCUMENTS

| | | |
|---|---|---|
| CA | 2 371 404 | 8/2002 |
| CN | 101516240 | 8/2009 |
| EP | 1 337 171 | 6/2002 |
| GB | 1 069 923 | 5/1967 |
| GB | 2 386 543 | 9/2003 |
| IN | 212483 | 2/2007 |
| JP | 2000-23844 | 1/2000 |
| JP | 2011-30767 | 7/2011 |
| WO | 2012/007257 | 1/2012 |
| WO | 2012/024265 | 2/2012 |
| WO | 2012/088719 | 7/2012 |

\* cited by examiner

DEVICES FOR BREWING AND/OR STEEPING TEA

CROSS-REFERENCE TO RELATED PATENT APPLICATIONS

The present application claims the benefit of priority under 35 U.S.C. §119(e) to U.S. Provisional Patent Application No. 61/953,297, filed on Mar. 14, 2014, the content of which is incorporated herein by reference in its entirety.

BACKGROUND

The field of the invention relates to devices and methods for brewing and/or steeping tea. In particular, the field of the invention relates to devices and methods for brewing and steeping tea that include and/or utilize steam, heated liquid, agitation, and recirculation.

Methods for brewing and steeping tea are known in the art. (See, e.g., GB1069923A; CA2152385A1; AU685073B2; U.S. Pat. No. 6,220,147B1; U.S. Pat. No. 6,488,976B1; GB2386543A; U.S. Pat. No. 6,915,732B2; JP03714800B2; U.S. Pat. No. 6,988,641B2; U.S. 20070059819A1; CA2371404C; U.S. Pat. No. 7,351,576B1; EP1337171B1; U.S. Pat. No. 7,757,600B2; U.S. 20110068118A1; CN101516240B; JP2011130767A; WO 2012024265A1; U.S. 20120100275A1; WO 2012088719A1; U.S. 20120186456A1; U.S. Pat. No. 8,534,186B2, the contents of which are incorporated herein by reference in their entireties). However, conventional methods of brewing and steeping tea are manually intensive and time consuming. New devices and methods for brewing and steeping tea that are less manually intensive and time consuming are desirable. Preferably, these devices and methods should provide tea that has similar or superior quality based on color, aroma, taste, and strength as tea that has been brewed and steeped by convention methods. These devices and methods should also provide a user with options to add various flavors such as spices and extracts if desired.

SUMMARY

Disclosed are devices and methods for brewing and/or steeping tea. In some embodiments, the devices may include: (a) a tea container; (b) an agitator; (c) a pump; and (d) a line connecting the tea container and the pump for recirculating tea from the tea container back into the tea container, where the line includes a dispensing outlet for removing tea from the device. Typically, the container includes: (i) a lid (optionally including a handle for removing the lid from the container); (ii) a strainer (e.g., for holding tea leaves and for straining and/or filtering the tea); (iii) a steam inlet for introducing steam into the container (optionally positioned in the lid of the container and optionally including a valve operated by a lever for controlling flow of steam into the container); (iv) a liquid inlet (e.g., for introducing water into the container, optionally positioned in the lid of the container and optionally including a valve operated by a lever for controlling flow of water into the container); optionally, (v) a recirculation inlet for receiving recirculated tea from the tea container. Optionally, the container includes an outlet for removing strained tea from the tea container (e.g., from the top or the bottom of the tea container). The pump is configured for recirculating tea from the container back to the container. The pump typically includes: (i) a pomp inlet for receiving strained tea from the container; and (ii) a pump outlet for returning recirculated tea into the container through the recirculation inlet. In some embodiments of the devices and methods, the direction of recirculation may be reversed.

In some embodiments, the device may include a heating element that extends into the container and a control unit for controlling heat that is provided by the heating element. In further embodiments, the liquid being introduced through the liquid inlet is heated liquid and the device further includes a heating element for heating the liquid prior to the liquid being introduced through the liquid inlet and a control device for controlling heat that is provided by the heating element. The control device for controlling heat that is provided by the heating element may include a lever for adjusting the temperature of the heating element.

In some embodiments, the dispensing outlet of the device includes a dispensing valve. The dispensing valve may include a lever for opening and closing the valve.

In some embodiments, the container comprises transparent polymeric or glass material. For example, the container may be transparent such that an operator can observe the color of the tea as the tea is brewing and/or steeping.

The pump is configured for recirculating tea from the container back into the container. As such, the pump recirculates tea from an outlet of the tea container (e.g., a strained tea outlet that may be positioned at the top of the bottom of the tea container) to the recirculation inlet of the tea container, which may be positioned at the top of the bottom of the tea container. The pump typically is connected to the tea container via one or more lines extending from a outlet of the tea container (e.g. a strained tea outlet) to an inlet of the pump (e.g., an inlet for receiving strained tea) and/or from an outlet of the pump to an inlet of the tea container (e.g., a recirculation inlet). As such, the tea container and the pump optionally may be connected via a first line extending from a strained tea outlet of the tea container to an inlet of the pump for receiving strained tea. The tea container and the pump optionally further may be connected via a second line extending from an outlet of the pump to a recirculation inlet of the tea container. Optionally, the pump may be a positively displacement pump.

The agitator of the device is configured for agitating the contents of the container. In some embodiments, the agitator is an electro-mechanical agitator or electro-mechanical stirrer (optionally located on the lid of the container) which is controlled by an actuator (optionally located on the lid of the container). In some embodiments, the agitator is controlled by an electric motor and a gear/linkage/CAM mechanism located on the lid or located remotely. In some embodiments, the contents of the tea container are agitated by introducing pressurized air and/or steam into the tea container. In some embodiments, agitation of the contents of the tea container is achieved indirectly via external agitation of the tea container.

Optionally, the brewing/steeping device may include one or more LEDs. In some embodiments, the brewing/steeping device includes or utilizes a signal to indicate when the tea is steeping, brewing, and/or ready for dispensing. Suitable signals may include, but are not limited to, an LED that changes color, or a digital, mechanical, or electro-mechanical pointer indicating that a step of steeping and/or brewing is occurring and/or completed and/or that the tea is ready for dispensing.

Optionally, the brewing/steeping device may be remotely activated and/or monitored, for example, via a mobile communication device (e.g., mobile phones, pads, tablets, and the like), where the mobile communication device may send a signal to the brewing/steeping device to start and/or stop brewing and/or steeping, and/or the brewing/steeping device may send a signal to the mobile device to indicate that brewing and/or steeping has begun and/or is complete and that the tea is ready for dispensing. Accordingly, the brewing/steeping device further may include a transmitter for sending the signal to the mobile communication device and/or a receiver for receiving a signal from the mobile communication device. As such, also contemplated herein are computer applications for a mobile communication device that may be loaded unto the mobile communication device and then utilized for communicating with and/or controlling the brewing/steeping devices disclosed herein.

Optionally, the brewing/steeping device may include a touch screen device. For example, a user may utilize the touch screen to provide an input to the brewing/steeping device in which the user selects criteria, including but not limited to, type of tea, brewing/steeping temperature, brewing/steeping time, and volume of product dispensed.

Also disclosed are methods for brewing and/or steeping tea. In some embodiments, the methods utilize the devices disclosed herein and include the following steps: (a) introducing tea leaves into the container; (b) closing the lid; (c) introducing steam into the container; (d) introducing liquid into the container (e.g., hot water); (e) agitating the contents of the container; (f) recirculating tea through the device; and (g) dispensing tea from the dispensing outlet. The methods further may include introducing steam subsequent to step (d), for example, in order to modulate the temperature inside the container. In other embodiments, the device further comprises a heating element extending into the container and the method further comprises heating the liquid in the container after step (d) by actuating the heating element, for example, in order to control the temperature inside the container. Where the device includes an LED that changes color or provides another type of indication to indicate when the tea is steeping, brewing, or ready for dispensing, the methods may include performing any steps of the method (a)-(g) before, during, or after the LED changes color or provides another type of indication.

DETAILED DESCRIPTION

Figure 1:
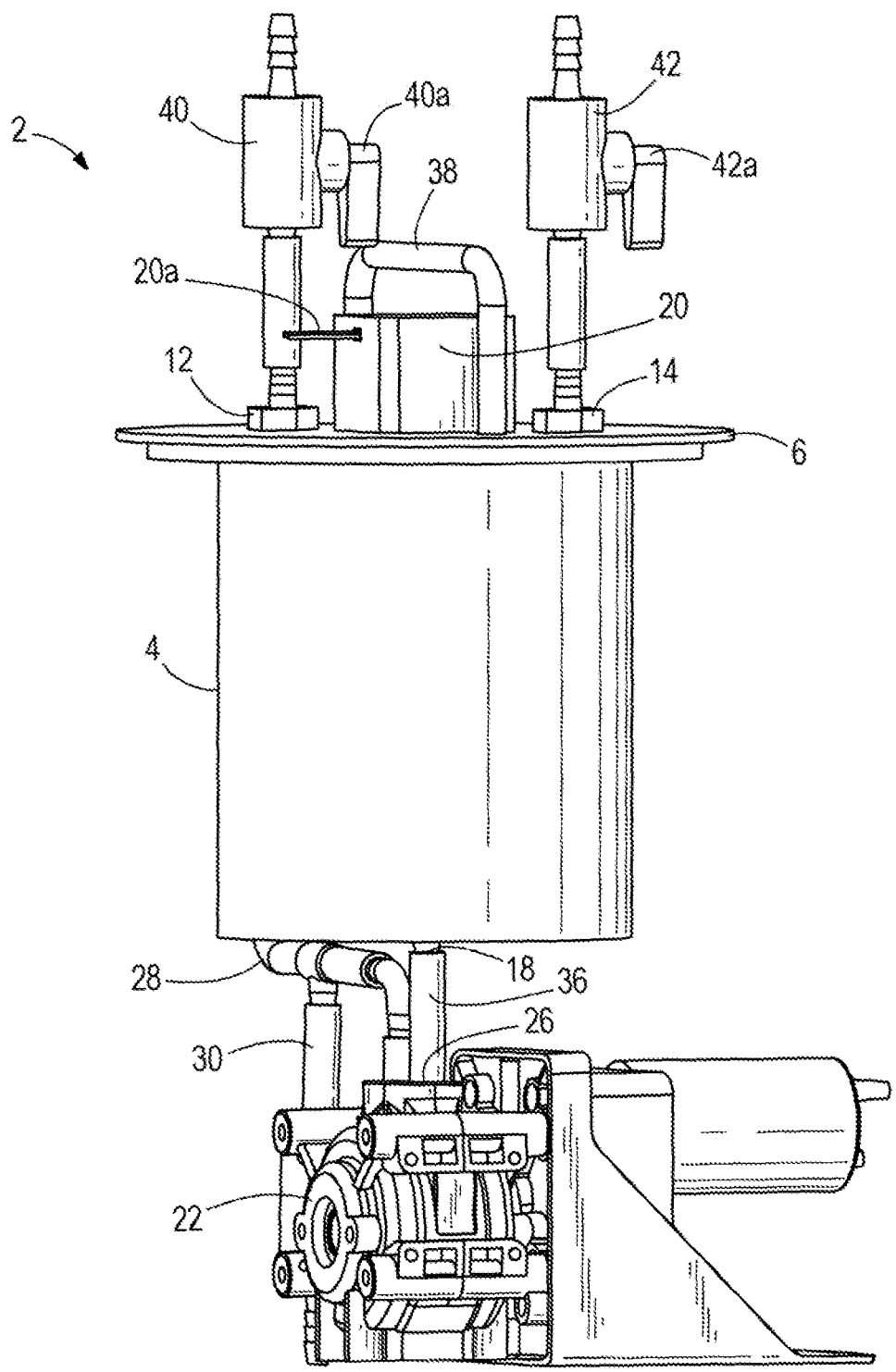
FIG. 1 provides an isomeric view of one embodiment of a device as contemplated herein.

Disclosed are devices and methods for brewing and/or steeping tea. The disclosed devices and methods for brewing and/or steeping tea further may be described by the following definitions and figures.

Unless otherwise noted, the terms used herein are to be understood according to conventional usage by those of ordinary skill in the relevant art. In addition to the definitions of terms provided below, it is to be understood that as used in the specification, embodiments, and in the claims, "a", "an", or "the" can mean one or more, depending upon the context in which it is used. For example, "an element" should be interpreted to mean "one or more elements," depending upon the context in which it is used.

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus ≤10% of the particular term and "substantially" and "significantly" will mean plus or minus >10% of the particular term, unless defined as otherwise herein.

As used herein, the terms "include" and "including" have the same meaning as the terms "comprise" and "comprising." For example, "a method that includes a step" should be interpreted to mean "a method that comprises a step." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion of additional components other than the components recited in the claims. The term "consisting essentially of" should be interpreted to be partially closed and permitting the inclusion only of additional components that do not fundamentally alter the nature of the claimed subject matter.

The devices and methods disclosed herein may be utilized to brew and/or steep a selected tea in less time compared to conventional methods. The teas thus brewed and/or steep have a quality, based on color, aroma, taste, and/or strength, which is similar or superior to tea brewed by conventional methods. The devices typically perform and the methods typically include steps such as steaming, steeping, agitation, recirculation and/or any combination of these steps.

The devices may include manual and/or electromechanical components. For example, the devices may include heating elements and control systems to provide user-selectable liquid temperature, which may be continuously adjustable. The devices may include aesthetic features. For example, the devices may be at least partially made of transparent material so that consumers may watch as their beverage is being prepared.

Because different types of teas require different brewing and/or steeping temperatures and brew and/or steep times, the disclosed devices are configured to provide precise brewing and/or steeping temperatures and brew and/or steep times for selected types of teas. For example, suggested brewing/steeping temperature and times may be as follows: black tea—98°, 3.5 min; green tea—79°, 2.5 min; white tea—77°, 3.5 min; and oolong tea—89°, 3 min. The devices also are configured to provide consistency in color (e.g., via spectrophotometer), aroma, flavor, texture, pH (e.g., via pH meter), and total dissolved solids (TDS) (e.g., via TDS/ppm meter) at the dispenser outlet of the device for any selected type of tea. The disclosed devices and methods may be programmable in such that multiple varieties of teas may be brewed and/or steeped concurrently.

The disclosed devices and methods may be utilized to brew and steep tea in less time than compared to conventional methods, while still providing tea having acceptable or superior quality, for example based on color, aroma, taste, and/or strength. The disclosed devices and methods may be utilized in commercial or retail settings, where conventional brewing and/or steeping methods may require too much time for practical use.

The disclosed methods may include steps as follows; (1) place tea leaves into the strainer of the container and close the lid of the container; (2) pass steam into the container such that the tea leaves absorb moisture and become loose; (3) pass hot liquid into the container at a selected temperature and quantity; (4) agitate the contents of the container using an electromechanical actuator or via a mechanical device; (5) recirculate the tea using the pump; optionally (6) introduce heat either through additional steam or through a heating element inside the container to maintain a selected temperature; optionally (7) monitor an LED light that changes color or provides another type of indication as various steps of the method are performed or completed; (8) dispense the tea using a dispenser outlet having an on/off valve which may be operated manually or automatically; optionally (9) cleaning and sanitizing the device after every cycle or selected time period using manual and/or automatic cleaning and sanitizing methods.

The disclosed devices may be capable of dispensing multiple flavors of tea. The tea may be customized, for example where the device may be utilized to dispense "light" tea and/or "strong" tea, for example based on color, taste, and/or aroma.

Figure 2:
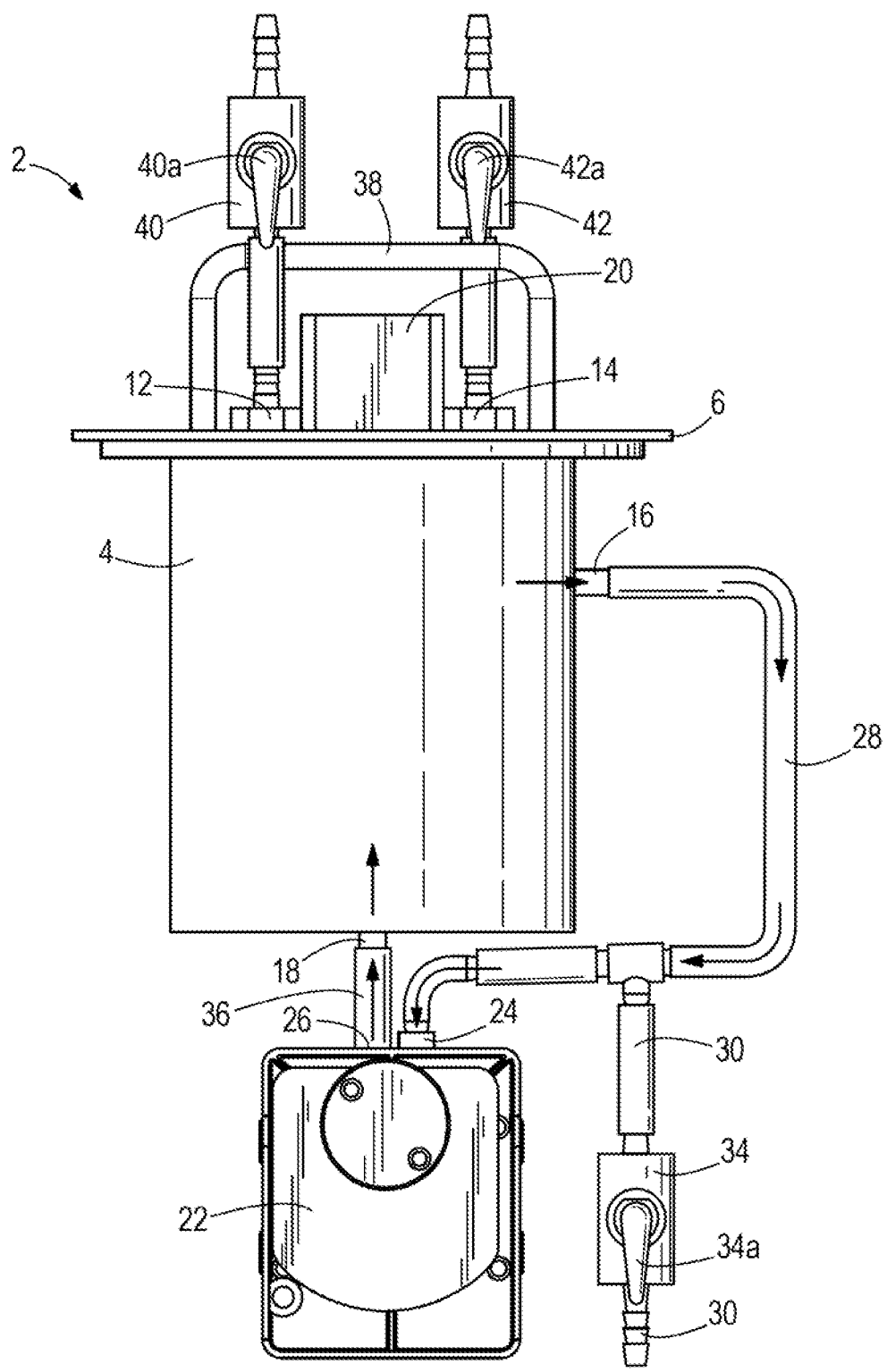
FIG. 2 provides a front view of one embodiment of a device as contemplated herein.
Figure 3:
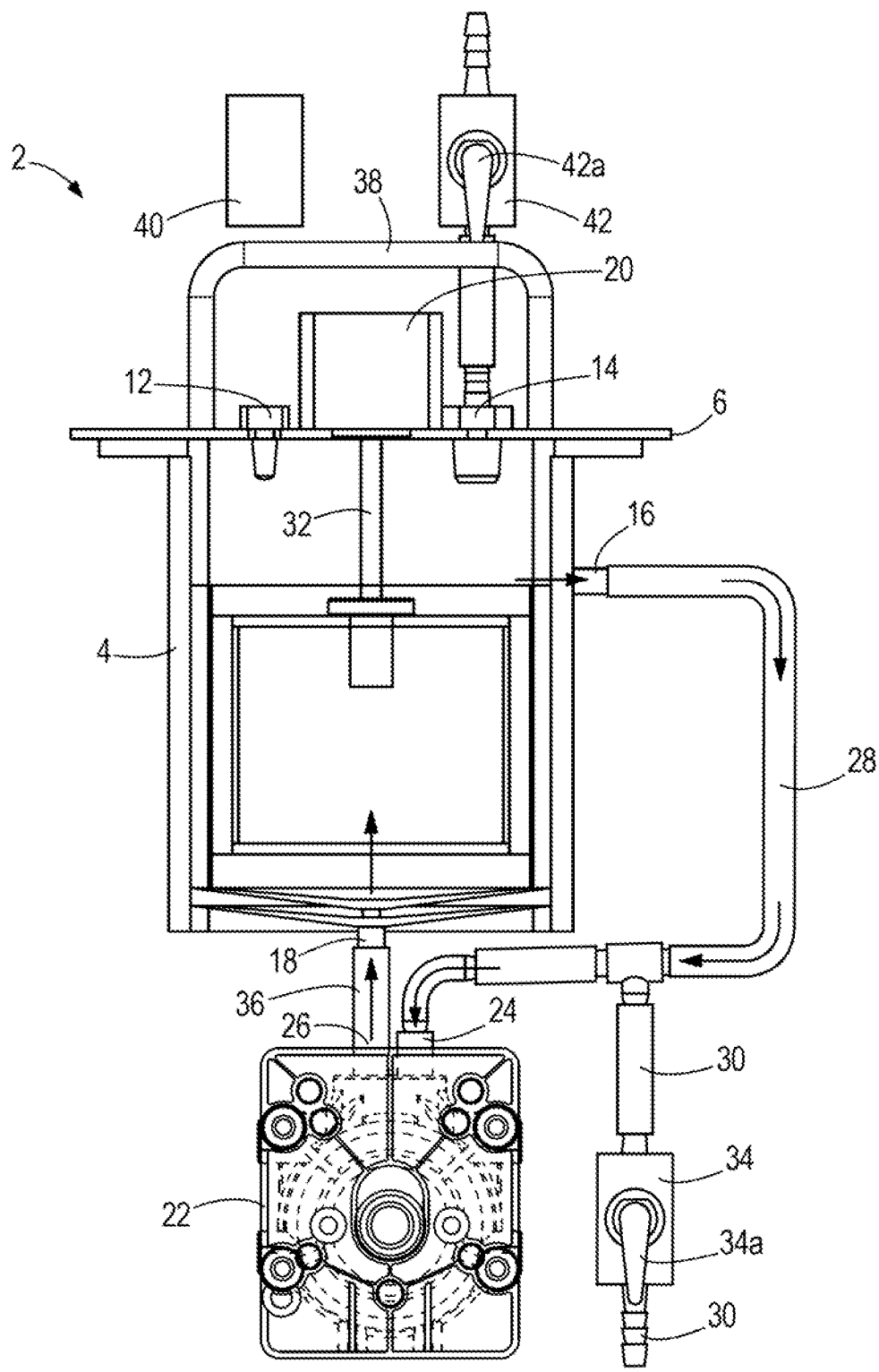
FIG. 3 provides a cross-sectional view of the device of FIG. 1.

Referring now to the figures, FIG. 1 provides a perspective view of one embodiment of a device as contemplated herein. FIG. 2 provides a front view of one embodiment of a device as contemplated herein, and FIG. 3 provides a cross-sectional view of the device of FIG. 1. As illustrated, the device 2 may include: (a) a tea container 4; (b) an agitator 20; (c) a pump 22; and (d) a line 28 connecting the container 4 and the pump 22 for recirculating tea from the container back into the container (see arrows), where the line includes a dispensing outlet for removing tea from the device 30. In some embodiments, recirculation may be bi-directional (i.e., in the direction of the illustrated arrows and/or in the reverse direction).

Typically, the container 4 includes: (i) a lid 6 (optionally including a handle 38 for removing the lid 6 from the container 4); (ii) a strainer 8 for holding tea leaves and/or for straining and/or filtering tea; (iii) a steam inlet 12 for introducing steam into the container (optionally positioned in the lid 6 of the container and optionally including a valve 40 operated by a lever 40a for controlling flow of steam into the container 4); (iv) a liquid inlet 14 for introducing liquid such as liquid into the container (optionally positioned in the lid 6 of the container and optionally including a valve 42 operated by a lever 42a for controlling flow of liquid into the container); (v) a strained tea outlet 16 for removing strained tea from the container; and (vi) a recirculation inlet 18 for receiving recirculated tea from the strained tea outlet 16. The pump 22 is configured for recirculating tea from the container back to the container. The pump typically includes: (i) a pump inlet 24 for receiving strained tea from the strained tea outlet of the container; and (ii) a pump outlet 26 for returning recirculated tea into the container through the recirculation inlet 18.

In some embodiments, the device may include a heating element 32 that extends into the container 4 and a control unit for controlling heat that is provided by the heating element 32. In further embodiments, the liquid being introduced through the liquid inlet is heated liquid and the device further includes a heating element for heating the liquid prior to the liquid being introduced through the liquid inlet and a control device for controlling heat that is provided by the heating element. The control device for controlling heat that is provided by the heating element may include a lever for adjusting the temperature of the heating element.

In some embodiments, the dispensing outlet 30 of the device includes a dispensing valve 34. The dispensing valve 34 may include a lever 34a for opening and closing the valve.

In some embodiments, the container 4 comprises transparent polymeric or glass material. For example, the container 4 may be transparent such that the color of the tea can be observed as the tea is brewing and/or steeping.

The pump 22 is configured for recirculating tea from the container back into the container. As such, the pump recirculates tea from the pump outlet 26 to the recirculation inlet 18 of the container, which may be connected by a line 36. In some embodiments, the direction of recirculation may be reversed. Optionally, the pump 22 may be a positively displacement pump.

The agitator 20 of the device is configured for agitating the contents of the tea. In the disclosed embodiments, the agitator 20 is an electro-mechanical agitator which is controlled by an actuator 20a.

Figure 4:
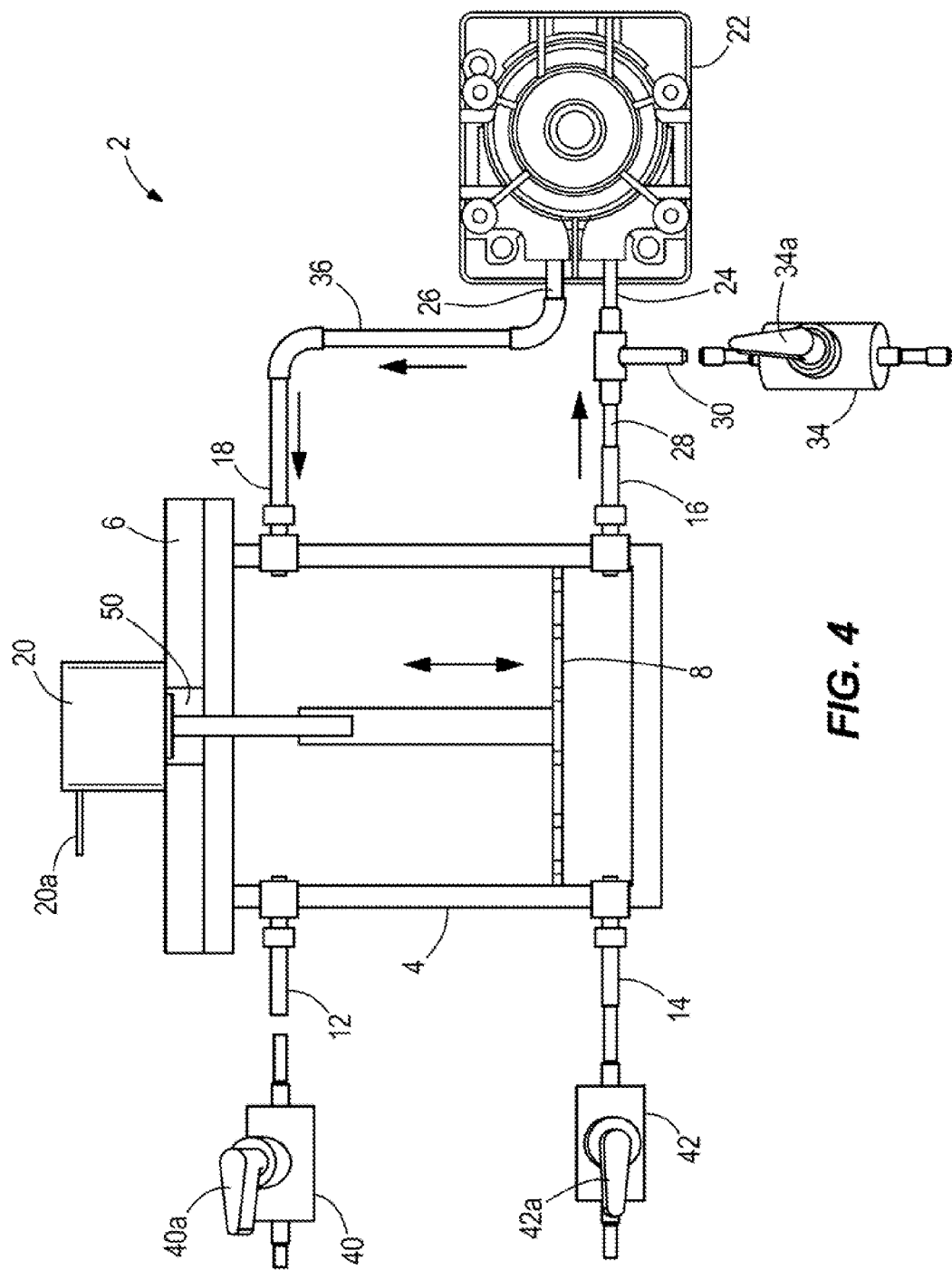
FIG. 4 illustrates a perspective view of another embodiment of a device as contemplated herein.

FIG. 4 illustrates a perspective view of another embodiment of a device 2 as contemplated herein. In FIG. 4, the steam inlet 12 and liquid inlet 14 are positioned in the container 4 rather than in the lid 6, as in FIGS. 1-3. The tea leaves are placed on top of the strainer 8 and strained tea exits through the strainer 8 and the strained tea outlet 16 to the pump 22. The strained tea may be recirculated to the recirculation inlet 18 of the container 4 or may be dispensed through the dispensing outlet 30 via the dispensing valve 34 and lever 34a. The agitator 20 effects vertical agitation as indicated by double-headed vertical arrow. The lid 6 includes an LED 50 that provides an indication when brewing and/or steeping is occurring and/or when brewing and/or steeping is/are complete.

Figure 5:
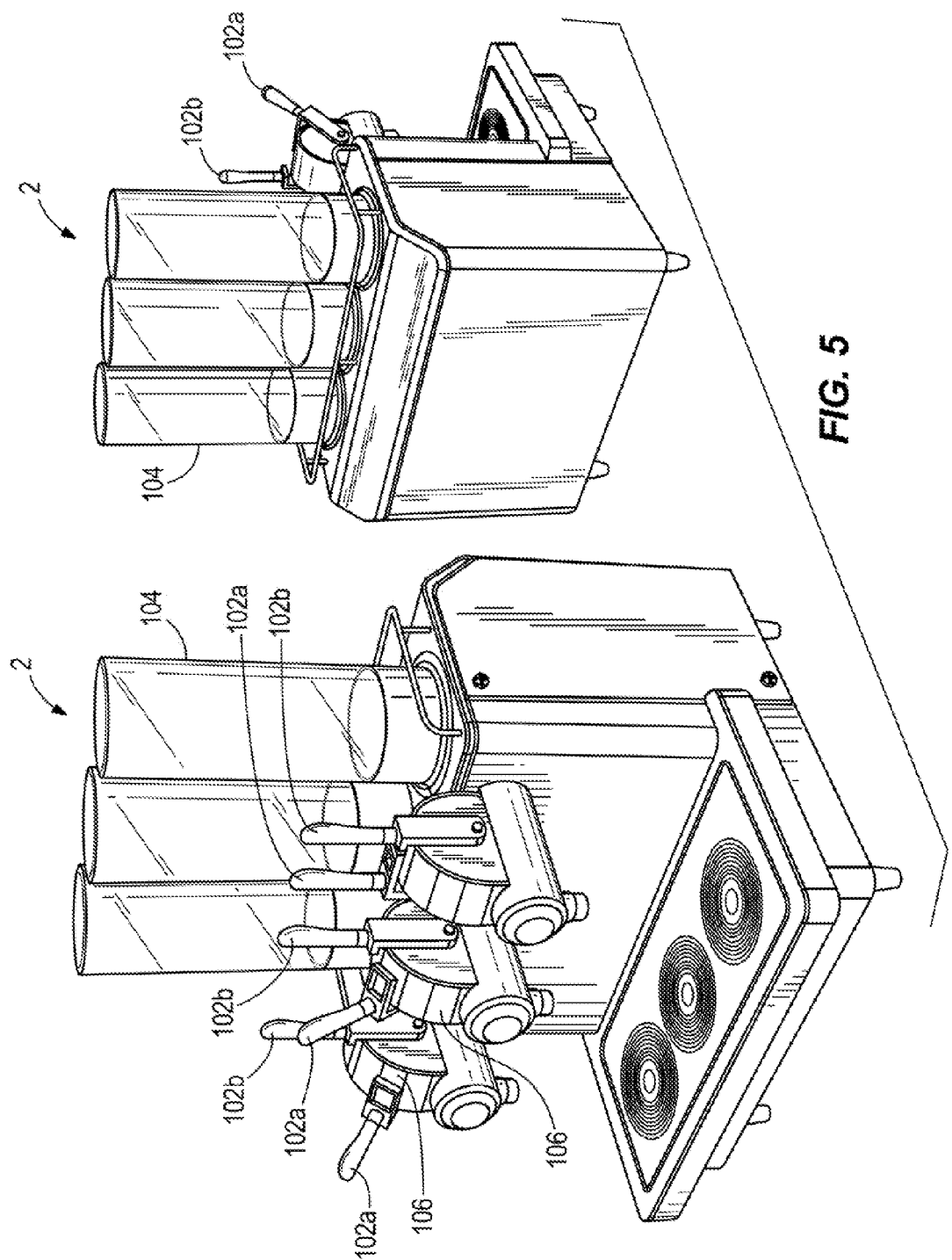
FIG. 5 illustrates a perspective view of another embodiment of a device as contemplated herein.

FIG. 5 illustrates a perspective view of another embodiment of a device 2 as contemplated herein. The device may include multiple visible water chambers 104 that store water heated to different temperatures (e.g., for brewing different types of teas). As illustrated in FIG. 5, the device 2 also may include ornamental and/or utility features for controlling temperature of brewing and/or steeping and/or controlling dispensing which resemble the controlling levers utilized in ships 102a and 102b. One lever may be utilized to control temperature 102a, and another lever may be utilized to control dispensing 102b. A user may pull the lever utilized to control temperature 102a, and rotate the lever 102a from a vertical position to a horizontal position to an indication marker 106 in order to designate the appropriate temperature for a selected type of tea. For example, the highest temperature may be selected when the lever 102a is rotated from a vertical position to the most distant position from vertical (e.g., horizontal). Heated water of the designated temperature will then flow into the corresponding water chamber 104 of the device. The other handle of the device 102b may be utilized to control flow rate at which tea is dispensed. A user may pull the lever utilized to control flow rate 102b, and rotate the lever 102b from a vertical position to a horizontal position to an indication marker 106 in order to designate the appropriate flow rate. For example, the highest flow rate may be selected when the lever 102b is rotated from a vertical position to the most distant position from vertical (e.g., horizontal).

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

Citations to a number of patent and non-patent references may be made herein. The cited references are incorporated by reference herein in their entireties. In the event that there is an inconsistency between a definition of a term in the specification as compared to a definition of the term in a cited reference, the term should be interpreted based on the definition in the specification.

What is claimed is:

1. A device for brewing tea, the device comprising:
   (a) a tea container, the container comprising:
      (i) a lid;
      (ii) a strainer for straining and/or filtering tea;
      (iii) a steam inlet for introducing steam into the container
      (iv) a liquid inlet for introducing liquid into the container;
      (v) an outlet for removing strained tea from the container; and
      (vi) a recirculation inlet for receiving recirculated tea from the strained tea outlet;
   (b) an agitator for agitating the contents of the container;
   (c) a pump comprising:
      (i) a pump inlet for receiving strained tea from the strained tea outlet of the container; and
      (ii) a pump outlet for returning recirculated tea into the container through the recirculation inlet; and
   (d) a line connecting the strained tea outlet of the container and the pump inlet of the pump, the line comprising a dispensing outlet for dispensing brewed tea.

2. The device of claim 1, wherein the steam inlet and the liquid inlet are positioned in the lid.

3. The device of claim 1, further comprising a heating element extending into the container.

4. The device of claim 3, further comprising a control unit for the heating element.

5. The device of claim 1, further comprising a heating element for heating the liquid prior to the liquid being introduced through the liquid inlet.

6. The device of claim 5, further comprising a control device for the heating element.

7. The device of claim 6, wherein the control device comprises a lever, dial, knob, slider, or other user interface for adjusting the temperature of the heating element.

8. The device of claim 1, wherein the dispensing outlet comprises a dispensing valve that is operated by a lever for opening and closing the valve.

9. The device of claim 1, wherein the container comprises transparent polymeric and/or glass material.

10. The device of claim 1, further comprising a second line connecting the pump outlet of the pump and the recirculation inlet of the container.

11. The device of claim 1, wherein the agitator is an electromechanical agitator.

12. The device of claim 1, further comprising a signal to indicate when the tea is steeping, brewing, or ready for dispensing.

13. The device of claim 12, wherein the signal is an LED that changes color, or a digital, mechanical, or electro-mechanical pointer.

14. The device of claim 1, wherein the pump is a positive displacement pump.

15. The device of claim 1, wherein the lid further comprises a handle or other ergonomic device for removing the lid from the container.

16. The device of claim 1, wherein the device further includes a transmitter for sending a signal to a mobile communication device and/or a receiver for receiving a signal from a mobile communication device.

17. The device of claim 16, wherein the signal transmitted to the mobile communication device informs the mobile communication device that brewing and/or steeping has begun and/or is complete.

18. The device of claim 16, wherein the signal received from the mobile communication device informs the brewing/steeping device to begin and/or stop brewing and/or steeping.

* * * * *